United States Statutory Invention Registration [19]

[11] Reg. Number: H358

Kaveney, Jr.

[43] Published: Nov. 3, 1987

[54] LATCH MECHANISM

[75] Inventor: John R. Kaveney, Jr., East Peoria, Ill.

[73] Assignee: Caterpillar Inc.

[21] Appl. No.: 938,106

[22] Filed: Dec. 4, 1986

[51] Int. Cl.[4] ..... F05C 3/06

[52] U.S. Cl. ..... 292/216; 292/DIG. 73

[58] Field of Search ..... 292/48, 216, 280, DIG. 41, 292/DIG. 55, DIG. 56, DIG. 73

*Primary Examiner*—Harold J. Tudor

*Attorney, Agent, or Firm*—Calvin E. Glastetter

[57] ABSTRACT

A latch mechanism is provided wherein the pawl has a concave recess which provides a vertical clearance between the pawl and the striker to allow limited vertical movement of the door. The vertical clearance reduces contact between the pawl and the striker to reduce wear.

4 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LATCH MECHANISM

DESCRIPTION

1. Technical Field

This invention relates to a latch mechanism and more particularly to a latch mechanism having a pawl which allows for increased vertical clearance between the pawl and striker and also includes a pivotal guide plate.

2. Background Art

Latch mechanisms are used to hold a door of a cab in the closed position and to prevent vertical movement of the door. The pawl of the latch mechanism is designed to fit around the striker without clearance in the vertical direction and cooperates with a fixed guide plate to maintain the door in a fixed position. Many of today's cabs are being designed with lighter weight material and softer mounts to prevent noise and vibration. Such cabs tend to distort somewhat and allows the door to move vertically relative to the door frame and striker. The latch mechanism closed around the striker resists the vertical movement of the door. The resulting interaction between the latch mechanism and the striker eventually damages the striker and the pawl of the latch mechanism.

DISCLOSURE OF THE INVENTION

In one aspect of the present invention a latch mechanism for engaging a striker is provided having a support structure with first and second support members fastened together by a plurality of pins. The latch mechanism has a pawl pivotally mounted between the first and second support members movable between an open and a closed position. The pawl has a concave recess providing vertical clearance between the pawl and striker. A spring urges the pawl to the open position. Releasable means is provided for holding the pawl in the closed position. A guide plate mounted between the first and second support member has a surface for contacting the striker.

BEST MODE FOR CARRYING OUT THE INVENTION

Figure 1:
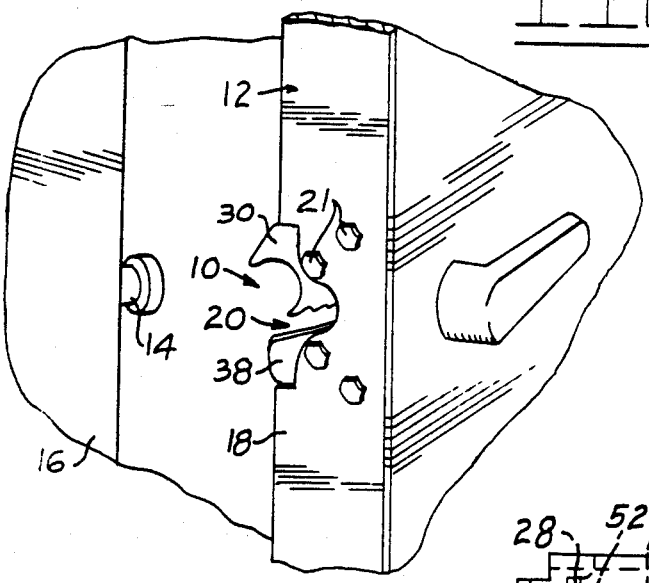
FIG. 1 is a partial perspective view of the latch mechanism with a striker on a door frame.
Figure 2:
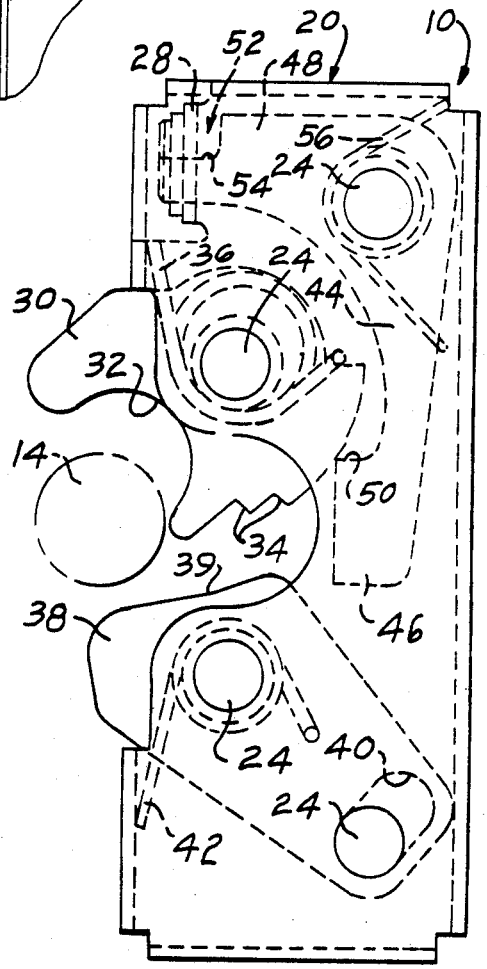
FIG. 2 is an end view of the latch mechanism in the open position with the pawl engaging the striker.
Figure 3:
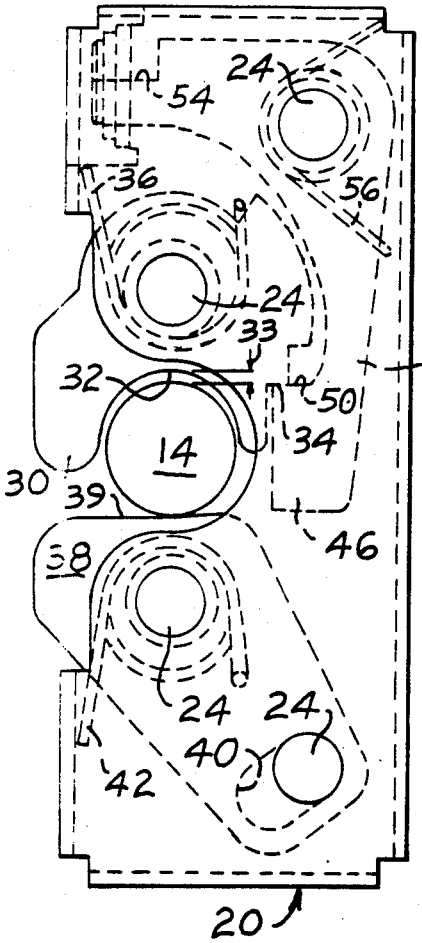
FIG. 3 is an end view of the latch mechanism in the closed position with the pawl engaging the striker.
Figure 4:
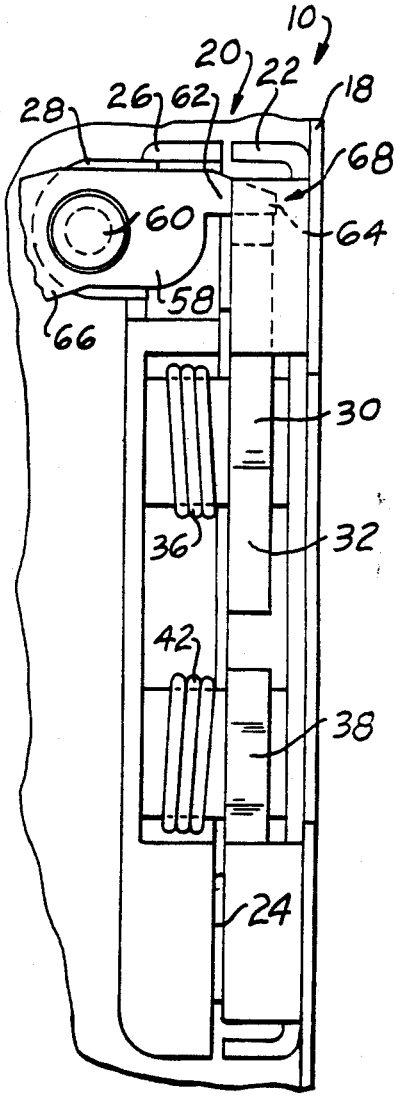
FIG. 4 is a side view of the latch mechanism.

A latch mechanism 10 is shown in FIG. 1 mounted inside a door, partially shown at 12, of a vehicle cab. A striker 14 is mounted on a door frame, partially shown at 16, of the cab for engagement by the latch mechanism 10 when the door is closed. The door has spaced apart inner and outer side panels and an end plate 18. The latch mechanism 10 includes a support structure 20 suitably connected to the end plate 18 by a plurality of fasteners 21. As best shown in FIGS. 2–4, the support structure 20 is a multipiece assembly having a first support member 22 connected to an end of a plurality of cylindrical pins 24 and a second support member 26 connected to an opposite end of the plurality of cylindrical pins 24. A tang 28 projects from the second support member 26.

A pawl 30 is positioned between the first support member 22 and the second support member 26 and is pivotally mounted on one of the pins 24. The pawl 30 has a concave circular recess 32 which provides a vertical clearance 33 when engaging the striker 14 and includes a plurality of detents 34. A torsion spring 36 urges the pawl 30 to an open position, as best shown in FIG. 2.

A guide plate 38 is positioned between the first support member 22 and the second support member 26 and is pivotally mounted at one end on another of the pins 24. A surface 39 contacts the striker 14 when closing and latching the door 12. A slot 40 in the other end of the guide plate 38 allows for pivotal movement on the pin 24 when closing the door. A torsion spring 42 urges the guide plate to a position for receiving the striker 14, as best shown in FIG. 2.

A release arm 44 is positioned between the first support member 22 and the second support member 26 and is pivotally mounted on another of the pins 24. The release arm 44 is L-shaped having a first leg 46 and a second leg 48. The first leg 46 has a contact surface 50 which engages the detents 34 of the pawl 30 when the pawl 30 is in the closed position as shown in FIG. 3. The second leg 48 of the release arm 44 has a notched portion 52 with a contact surface 54. A torsion spring 56 urges the release arm 44 into contact with the detents 34 of the pawl 30 to maintain the pawl 30 in the closed position. An actuating lever 58 is pivotally connected to the tang 28 of the second support member 26 by a pivot pin 60. A first end 62 of the actuating lever 58 has a projection 64 which engages the contact surface 54 of the release arm. A second end 66 of the actuating lever 58 is connectable to an actuating mechanism (not shown).

The release arm 44 and spring 56 constitute a means 68 for releasably holding the pawl 30 in the closed position.

Industrial Applicability

In operation when the door 12 is closed the pawl 30 and guide plate 38 are rotated from the open position as shown in FIGS. 1 and 2 to the closed position as shown in FIG. 3. As the door is closed the pawl 30 contacts the striker 14 and begins to rotate, against the force of the spring 36 to engage the striker 14. The striker also contacts the guide plate 38 causing it to rotate against the force of the spring 42. When the pawl 30 reaches the closed position the spring 56 urges the contact surface 50 of the release arm 44 into contact with the detent 34 to hold the pawl 30 in the closed position.

In the closed position the recess 32 of the pawl 30 provides the vertical clearance 33 between the pawl 30 and the striker 14. Should the cab be distorted to cause the door 12 to move downward relative to the striker, the spring 42 rotates the guide plate 38 to maintain contact with the striker.

In view of the foregoing, it is readily apparent that the structure of the present invention provides a latch mechanism which provides vertical clearance between the pawl and striker. The vertical clearance will allow limited vertical movement of the door and reduce wear between the latch mechanism and striker.

Other aspects, objects and advantages of this invention can be obtained from a study of the drawings, the disclosure and the appended claims.

I claim:

1. A latch mechanism adapted for engaging a striker, said latch mechanism comprising:

a support structure having a first and a second support member fastened together by a plurality of pins;

a pawl positioned between the first and second support members and being pivotally mounted on one of the plurality of pins movable between open and closed positions, said pawl having a concave recess having a diameter greater than the striker providing for vertical clearance between the pawl and striker;

a spring urging the pawl to the open position;

means for releasably holding the pawl in the closed position; and a guide plate positioned between the first and second support members mounted on another of the plurality of pins, said guide plate having a surface for contacting the striker.

2. The latch mechanism of claim 1 wherein the guide plate is pivotally mounted on the pins.

3. The latch mechanism of claim 2 wherein the guide plate further includes a slot to allow for pivotal movement.

4. The latch mechanism of claim 2 wherein a spring urges the guide plate to a position for receiving the striker.

* * * * *